(12) United States Patent
Wong

(10) Patent No.: US 10,947,014 B2
(45) Date of Patent: Mar. 16, 2021

(54) BAGS WITH MARKS AND SYSTEMS OF MAKING SAME

(71) Applicant: FORESIGHT USA, INC., Suwanee, GA (US)

(72) Inventor: Fung Steven Wong, Suwanee, GA (US)

(73) Assignee: FORESIGHT USA, INC., Suwanee, GA (US)

( * ) Notice: Subject to any disclaimer, the term of this patent is extended or adjusted under 35 U.S.C. 154(b) by 250 days.

(21) Appl. No.: 16/183,906

(22) Filed: Nov. 8, 2018

(65) Prior Publication Data
US 2019/0071218 A1 Mar. 7, 2019

Related U.S. Application Data

(63) Continuation of application No. 15/284,885, filed on Oct. 4, 2016, now abandoned.
(Continued)

(51) Int. Cl.
B65D 33/00 (2006.01)
B29C 59/00 (2006.01)
(Continued)

(52) U.S. Cl.
CPC .......... B65D 33/004 (2013.01); B29C 59/007 (2013.01); B29C 69/002 (2013.01); B31B 70/00 (2017.08); B31B 70/006 (2017.08); B31B 70/14 (2017.08); B31B 70/645 (2017.08); B31B 70/88 (2017.08); B41F 17/008 (2013.01); B41F 19/008 (2013.01); B65D 33/002 (2013.01); B31B 70/005 (2017.08); B31B 70/16 (2017.08); B31B 70/642 (2017.08);
(Continued)

(58) Field of Classification Search
None
See application file for complete search history.

(56) References Cited

U.S. PATENT DOCUMENTS 5,041,317 A * 8/1991 Greyvenstein ....... B65D 33/002
428/35.5
5,882,118 A * 3/1999 Daniels ................ B65D 33/001
206/831
(Continued)

FOREIGN PATENT DOCUMENTS

JP 09110082 A * 4/1997

Primary Examiner — Hemant Desai
Assistant Examiner — Tanzim Imam
(74) Attorney, Agent, or Firm — Locke Lord LLP; Tim Tingkang Xia, Esq.

(57) ABSTRACT

A system for manufacturing bags with counting marks includes a workstation for making bags, and a coding machine for spraying counting marks on the bags. The coding machine includes a main body, a fixing structure and a spraying gun. The main body has ink cartridges for providing ink and a pressure mechanism to spray the ink through the spraying gun. The spraying gun is fixed to a fixing structure and connected to the main body via a cable such that the ink of the ink cartridges is operably moved from the ink cartridge to the spraying gun via the cable. The cable includes channels, each channel adapted for delivering a respective color of the ink. The spraying gun includes nozzles coupled to the channels for spraying the ink on the bags so as to form the counting marks thereon.

15 Claims, 8 Drawing Sheets

Related U.S. Application Data

(60) Provisional application No. 62/239,364, filed on Oct. 9, 2015.

(51) Int. Cl.
| | |
|---|---|
| *B29C 65/00* | (2006.01) |
| *B29C 69/00* | (2006.01) |
| *B41F 17/00* | (2006.01) |
| *B31B 70/00* | (2017.01) |
| *B31B 70/88* | (2017.01) |
| *B31B 70/14* | (2017.01) |
| *B31B 70/64* | (2017.01) |
| *B41F 19/00* | (2006.01) |
| *B31B 70/94* | (2017.01) |
| *B31B 70/81* | (2017.01) |
| *B31B 70/16* | (2017.01) |
| *B31B 155/00* | (2017.01) |
| *B31B 160/10* | (2017.01) |
| *B31B 170/10* | (2017.01) |

(52) U.S. Cl.
CPC ......... *B31B 70/8122* (2017.08); *B31B 70/942* (2017.08); *B31B 2155/003* (2017.08); *B31B 2160/10* (2017.08); *B31B 2170/10* (2017.08)

(56) References Cited

U.S. PATENT DOCUMENTS

| | | | |
|---|---|---|---|
| 2004/0016656 A1* | 1/2004 | Goldenberg | B65D 85/18 206/278 |
| 2004/0245270 A1* | 12/2004 | Tan | B29C 65/7457 221/63 |
| 2004/0255556 A1* | 12/2004 | Boal | B65B 43/267 53/433 |
| 2005/0040278 A1* | 2/2005 | Allgood | B65H 29/006 242/521 |
| 2005/0178493 A1* | 8/2005 | Broering | B31B 50/00 156/197 |
| 2009/0028471 A1* | 1/2009 | Tan | B65D 31/16 383/107 |
| 2011/0164834 A1* | 7/2011 | Stiglic | B65F 1/0026 383/75 |

\* cited by examiner

BAGS WITH MARKS AND SYSTEMS OF MAKING SAME

CROSS-REFERENCE TO RELATED APPLICATIONS

This application is a continuation application of U.S. application Ser. No. 15/284,885, filed Oct. 4, 2016, which itself claims priority to and the benefit of U.S. Provisional Application Ser. No. 62/239,364, filed on Oct. 9, 2015, which are incorporated herein by reference in their entireties.

FIELD OF THE INVENTION

The invention relates generally to systems and methods for manufacturing a roll of bags, and more particularly to systems and methods for manufacturing a roll of bags that has marks to remind a user of the number of bags remaining in the roll, and bags with marks.

BACKGROUND OF THE INVENTION

The background description provided herein is for the purpose of generally presenting the context of the present invention. The subject matter discussed in the background of the invention section should not be assumed to be prior art merely as a result of its mention in the background of the invention section. Similarly, a problem mentioned in the background of the invention section or associated with the subject matter of the background of the invention section should not be assumed to have been previously recognized in the prior art. The subject matter in the background of the invention section merely represents different approaches, which in and of themselves may also be inventions. Work of the presently named inventors, to the extent it is described in the background of the invention section, as well as aspects of the description that may not otherwise qualify as prior art at the time of filing, are neither expressly nor impliedly admitted as prior art against the present invention.

A small pack or a roll of dog poop bags is used for cleaning poop of a dog. A user, before walking the dog, may take one or a few poop bags from the roll. However, it is hard to track the number of poop bags used, and it is inconvenient to see if there is no poop bag left or if there is only one or two poop bags left.

Therefore, a heretofore unaddressed need exists in the art to address the aforementioned deficiencies and inadequacies.

SUMMARY OF THE INVENTION

In one aspect, the present invention relates to a method of manufacturing a roll of bags. In certain embodiments, the method includes:
moving a layflat tubing from a feed end of a workstation toward a produce end of the workstation by a moving mechanism of the workstation, wherein the layflat tubing has a length direction and a width direction;
sealing the layflat tubing by a sealing mechanism of the workstation, so as to form a plurality of sealing lines each along the width direction;
punching the layflat tubing by a punching mechanism of the workstation, so as to form a plurality of punching lines each along the width direction;
spraying, by a coding machine coupled to the workstation, at least one counting mark at desired positions on the layflat tubing, where each counting mark is located between two adjacent punching lines;
cutting, by a cutting mechanism of the workstation, the layflat tubing along the width direction to form a plurality of connected bags; and
winding the connected bags into the roll of bags,
wherein the connected bags in the roll of bags are separated by the punching lines, each of the connected bags comprises one of the sealing lines, and at least one bag has one of the at least one sprayed counting mark that counts its relative position of the at least one bag in the roll of bags.

In certain embodiments, the method further includes coordinating operations of the workstation and the coding machine by a controller.

In certain embodiments, a number of the connected bags is about 5-50. In certain embodiments, each of the very last 3-5 bags in the roll of bags has a sprayed counting mark that counts how many bags remain in the roll of bags, or each of the roll of bags has a sprayed counting mark that consecutively counts each bag so that a user knows how many bags remain in the roll of bags.

In certain embodiments, the at least one counting mark comprises a plurality of counting marks that are different from each other, and each of the counting marks is printed on one of the connected bags located at an inner side of the roll of bags. In certain embodiments, the at least one counting mark includes at least one number, at least one warning message, at least one color paint, and/or a combination thereof.

In certain embodiments, the method further includes heating the punching mechanism to a predetermined temperature. In certain embodiments, the method further includes configuring a length of each of the connected bags by an adjusting mechanism of the workstation. In certain embodiments, the method further includes entering parameters through an interface of the workstation. In certain embodiments, the method further includes positioning a nozzle of the coding gun relative to the workstation.

In certain embodiments, the coding machine includes an interface for configuring parameters of the at least one counting mark, and the parameters comprises content of the at least one counting mark, font of the at least one counting mark, direction of the at least one counting mark, and distance between components of the at least one counting mark.

In another aspect, the present invention relates to a roll of bags. In certain embodiments, the roll of bags includes a plurality of bags that are separated by punching lines. Each of the bags is sealed with a sealing line, and at least one bag of the roll of bags has a counting mark that counts its relative position of the at least one bag in the roll of bags.

In certain embodiments, each of the very last 3-5 bags in the roll of bags has a counting mark that counts how many bags remain in the roll of bats, or each of the roll of bags has a counting mark that consecutively counts each bag so that a user knows how many bags remain in the roll of bags.

In certain embodiments, the roll of bags is made by a workstation from a layflat tubing, and the counting mark is sprayed on the at least one bag by a coding machine.

In a further aspect, the present invention relates to a system for manufacturing a roll of bags. In certain embodiments, the system includes a workstation and a coding machine.

The workstation has a feed end and a produce end, and includes: a moving mechanism configured to move a layflat tubing from the feed end toward the produce end, wherein the layflat tubing comprises a length direction and a width direction; a sealing mechanism configured to seal the layflat tubing to form a plurality of sealing lines, each of the sealing lines along the width direction; a punching mechanism configured to punch the layflat tubing to form a plurality of punching lines, each of the punching lines along the width direction; a cutting mechanism configured to cut the layflat tubing along the width direction to form a plurality of connected bags; and a winding mechanism configured to wind the connected bags into the roll of bags.

The coding machine is coupled to the workstation, and configured to spraying at least one counting mark on the layflat tubing. The coding machine comprises a main body, a fixing structure and a spraying gun. The main body comprises one or more replaceable ink cartridges for providing ink and a pressure mechanism to spray the ink through the spraying gun. The spraying gun is fixed to the fixing structure and connected to the main body via a cable such that the ink of the one or more replaceable ink cartridges is operably moved from the one or more replaceable ink cartridges of the main body to the spraying gun via the cable, where the cable comprises one or more channels, and each channel is adapted for delivering a respective color of the ink. The spraying gun comprises one or more nozzles coupled to the one or more channels of the cable for spraying the ink on the layflat tubing so as to form the at least one counting mark thereon.

In certain embodiments, the coding machine is positioned relative to the workstation.

In certain embodiments, the main body of the coding machine comprises a screen for displaying operations of the coding machine. Further, the screen is a touch screen configured for a user to enter parameters for the operations of the coding machine.

In certain embodiments, the one or more replaceable ink cartridges comprise a red cartridge, a green cartridge and a blue cartridge. In certain embodiments, the cable comprises three channels, and each channel is corresponding to one of the red, green and blue cartridges. In certain embodiments, the three channels are merged to one nozzle of the spraying gun such that the produced ink has a specific color corresponding to an amount of three inks delivered. In certain embodiments, each of the three channels is corresponding to one of the one or more nozzles of the spraying gun so as to form a counting mark with different colors.

In certain embodiments, the one or more replaceable ink cartridges comprise a black ink cartridge containing black ink that operably passes through one of the one or more channels of the cable, and is sprayed out through the one or more nozzles to form a black counting mark on the targeted bag units.

In certain embodiments, the workstation further comprises an infrared color sensor for detecting position of the bag unit, wherein the infrared color sensor is configured to emit an infrared light toward the layflat tubing, senses the light reflected by the layflat tubing, and detect changes of the emitted light and the received light so as to locate the position of the bag unit. In certain embodiments, the infrared color sensor is coupled with the coding machine to detect the counting mark on the bag unit sprayed by the coding machine so as to ensure spraying the counting mark accurately on the targeted bag units.

The connected bags in the roll of bags are separated by the punching lines, each of the connected bags comprises one of the sealing lines, and at least one bag of the roll of bags has one of the at least one sprayed counting mark that counts its relative position of the at least one bag in the roll of bags.

In certain embodiments, the at least one counting mark comprises a plurality of counting marks that are different from each other, and the counting marks are each printed on one of the connected bags located at an inner side of the roll of bags.

In certain embodiments, the at least one counting mark comprises a number, a warning message, a color paint, and a combination thereof.

In certain embodiments, the system further includes a controller configured to coordinate operations of the workstation and the coding machine.

In certain embodiments, the system further includes a layflat tubing making machine configured to make the layflat tubing, and the workstation, the coding machine and the layflat tubing making machine are controlled by the controller to automatically making the roll of bags from plastic material fed to the layflat tubing machine.

In yet another aspect, the present invention relates to a non-transitory computer-readable medium storing instructions which, when executed by one or more processors, cause a system to manufacture a roll of bags according to the above described method.

These and other aspects of the present invention will become apparent from the following description of the embodiment taken in conjunction with the following drawings, although variations and modifications therein may be affected without departing from the spirit and scope of the novel concepts of the present invention.

BRIEF DESCRIPTION OF THE DRAWINGS

The accompanying drawings illustrate one or more embodiments of the invention and, together with the written description, serve to explain the principles of the invention. Wherever possible, the same reference numbers are used throughout the drawings to refer to the same or like elements of an embodiment.

DETAILED DESCRIPTION OF THE INVENTION

Figure 1:
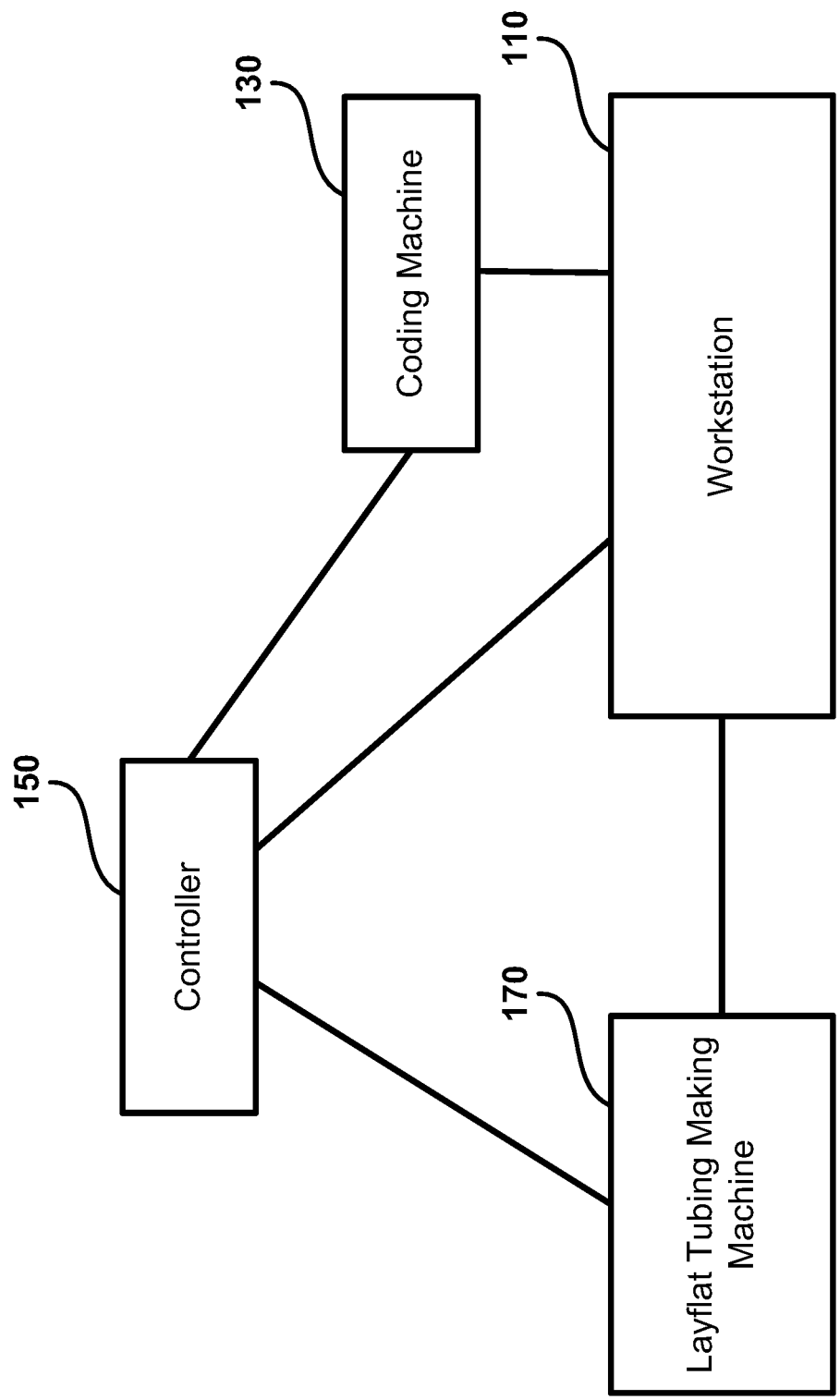
FIG. 1 schematically shows a system for manufacturing a roll of bags according to one embodiment of the present invention.

The present disclosure is more particularly described in the following examples that are intended as illustrative only since numerous modifications and variations therein will be apparent to those skilled in the art. Various embodiments of the disclosure are now described in detail. Referring to the drawings, like numbers, if any, indicate like components throughout the views. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the disclosure or of any exemplified term. Likewise, the disclosure is not limited to various embodiments given in this specification.

Unless otherwise defined, all technical and scientific terms used herein have the same meaning as commonly understood by one of ordinary skill in the art to which this disclosure pertains. In the case of conflict, the present document, including definitions will control.

As used herein, the singular forms "a", "an" and "the" are intended to include the plural forms as well, unless the context clearly indicates otherwise.

It will be further understood that the terms "comprises" and/or "comprising", or "includes" and/or "including", or "carry" and/or "carrying", or "involve" and/or "involving" or "has/have" and/or "having" when used in this specification specify the presence of stated features, regions, integers, steps, operations, elements, and/or components, but do not preclude the presence or addition of one or more other features, regions, integers, steps, operations, elements, components, and/or groups thereof. As used herein, the term "and/or" includes any and all combinations of one or more of the associated listed items.

As used herein, "around", "about", "substantially" or "approximately" shall generally mean within 20 percent, preferably within 10 percent, and more preferably within 5 percent of a given value or range. Numerical quantities given herein are approximate, meaning that the terms "around", "about", "substantially" or "approximately" can be inferred if not expressly stated.

It will be understood that when an element is referred to as being "on", "attached" to, "connected" to, "coupled" with, "contacting", etc., another element, it can be directly on, attached to, connected to, coupled with or contacting the other element or intervening elements may also be present. In contrast, when an element is referred to as being, for example, "directly on", "directly attached" to, "directly connected" to, "directly coupled" with or "directly contacting" another element, there are no intervening elements present. It will also be appreciated by those of skill in the art that references to a structure or feature that is disposed "adjacent" to another feature may have portions that overlap or underlie the adjacent feature.

Furthermore, relative terms, such as "lower" or "bottom" and "upper" or "top", may be used herein to describe one element's relationship to another element as illustrated in the FIGS. It will be understood that relative terms are intended to encompass different orientations of the device in addition to the orientation shown in the FIGS. For example, if the device in one of the figures is turned over, elements described as being on the "lower" side of other elements would then be oriented on the "upper" sides of the other elements. The exemplary term "lower" can, therefore, encompass both an orientation of lower and upper, depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

As used herein, the phrase "at least one of A, B, and C" should be construed to mean a logical (A or B or C), using a non-exclusive logical OR. It should be understood that one or more steps within a method may be executed in different order (or concurrently) without altering the principles of the invention.

As used herein, the term "module" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term "code", as used herein, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The term "interface", as used herein, generally refers to a communication tool or means at a point of interaction between components for performing data communication between the components. Generally, an interface may be applicable at the level of both hardware and software, and may be uni-directional or bi-directional interface. Examples of physical hardware interface may include electrical connectors, buses, ports, cables, terminals, and other I/O devices or components. The components in communication with the interface may be, for example, multiple components or peripheral devices of a computer system.

The terms "chip" or "computer chip", as used herein, generally refers to a hardware electronic component, and may refer to or include a small electronic circuit unit, also known as an integrated circuit (IC), or a combination of electronic circuits or ICs.

The terms "layflat tubing" or "lay-flat tubing", as used herein, generally refers to a plastic film for products such as shopping bags. The layflat tubing may be manufactured by a blown film line to extrude a tube of plastics and then flatten the extruded tubes.

The description will be made as to the embodiments of the invention in conjunction with the accompanying drawings. In accordance with the purposes of this invention, as embodied and broadly described herein, this invention, in one aspect, relates to a system for manufacturing bags and applications of the same.

FIG. 1 schematically shows a system for manufacturing a roll of bags according to one embodiment of the present invention. As shown in FIG. 1, the system 100 for manufacturing a roll of bags includes a workstation 110, a coding machine 130, and a controller 150. The coding machine 130 is coupled to the workstation 110. The controller 150 is connected with the workstation 110 and the coding machine 130, and is configured to control the workstation 110 and the coding machine 130. The system 100 is configured to use layflat tubing as input, to produce a roll of bags. In certain embodiments, the system 100 may further include a layflat tubing making machine 170 to produce the layflat tubing.

Figure 2C:
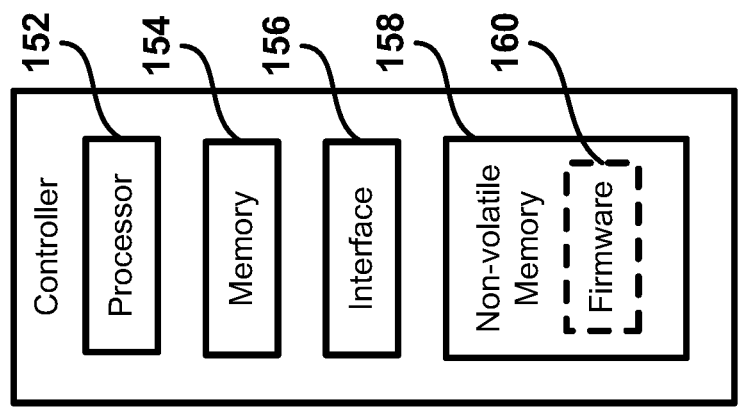
FIG. 2C schematically shows a controller according to one embodiment of the present invention.
Figure 2B:
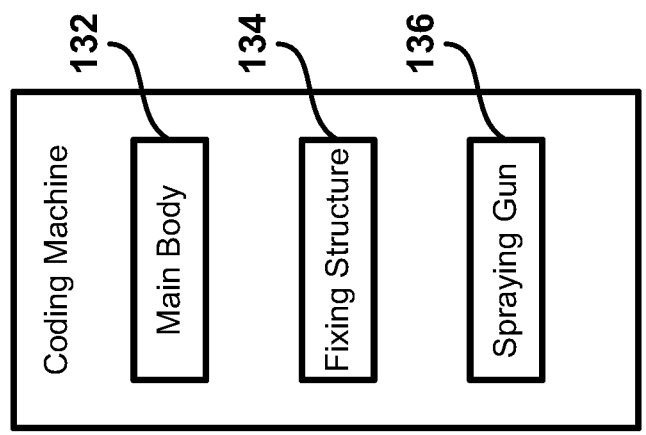
FIG. 2B schematically shows a coding machine according to one embodiment of the present invention.
Figure 2A:
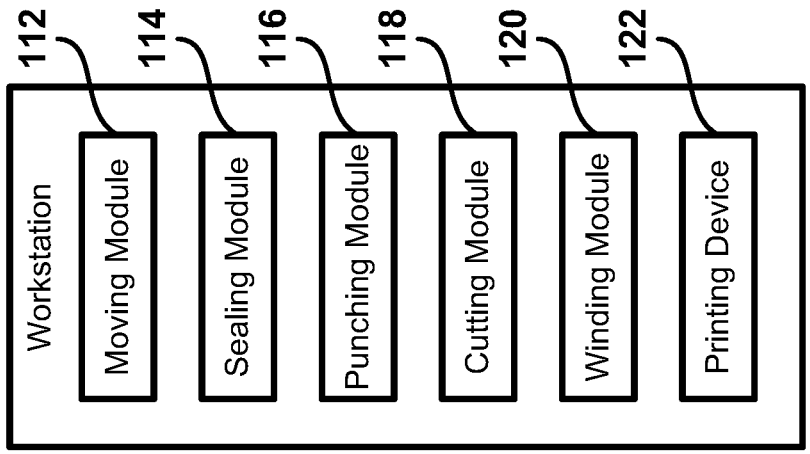
FIG. 2A schematically shows a workstation according to one embodiment of the present invention.

As shown in FIG. 2A, the workstation 110 includes a moving module 112, a sealing module 114, a punching module 116, a cutting module 118, a winding module 120, and a printing device 122.

Figure 3:
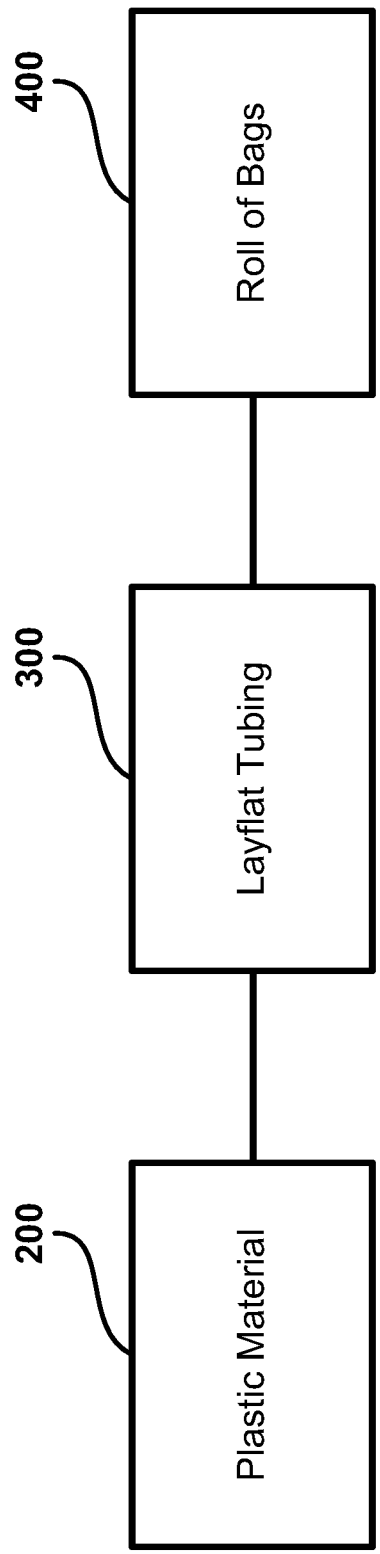
FIG. 3 schematically shows manufacturing of a roll of bags from plastic material according to one embodiment of the present invention.
Figure 5:
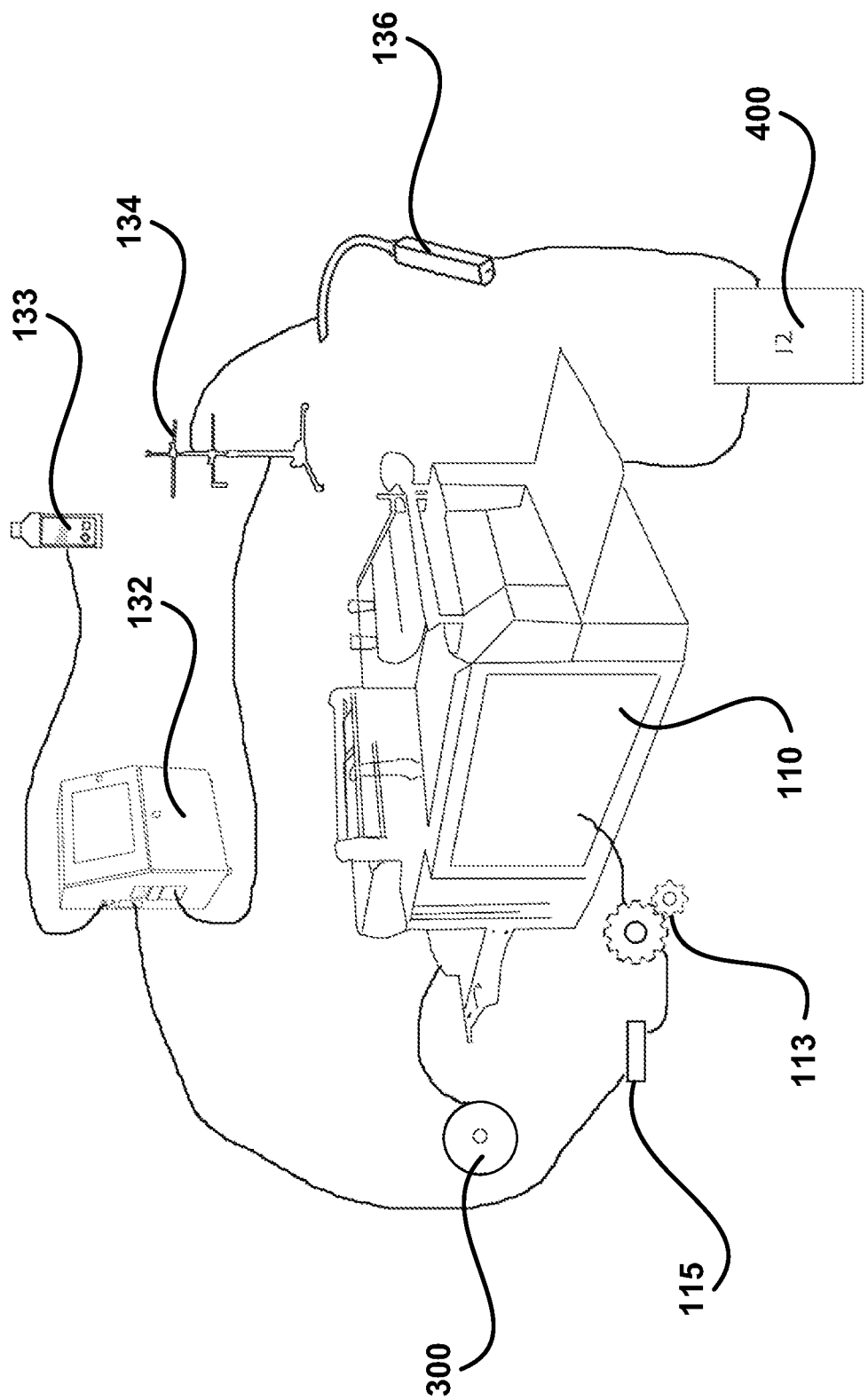
FIG. 5 schematically shows an exploded view of a system for manufacturing a roll of bags according to one embodiment of the present invention.
Figure 6:
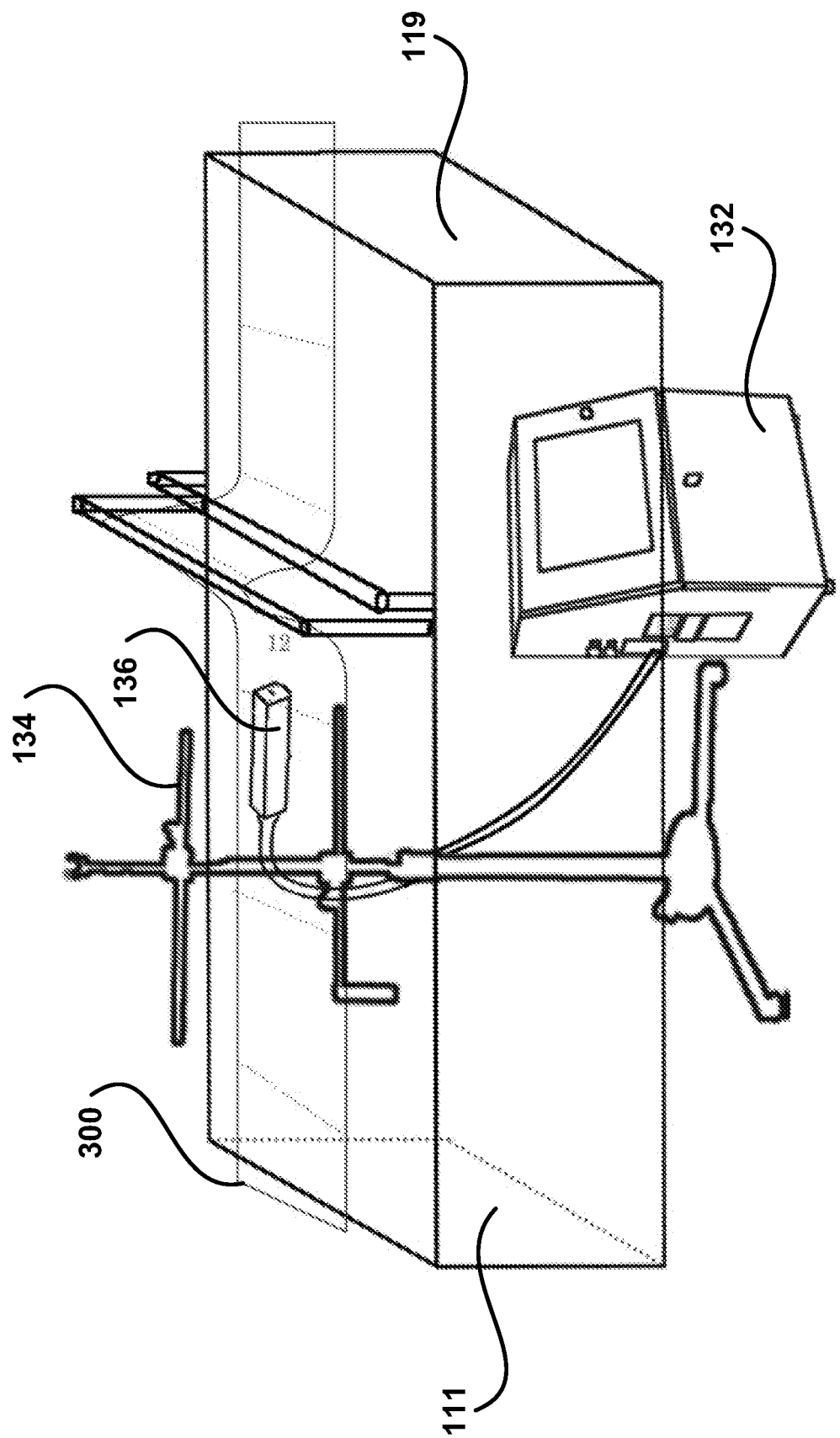
FIG. 6 schematically shows an assembly view of a system for manufacturing a roll of bags according to one embodiment of the present invention.

The moving module 112, when in operation, is configured to move a layflat tubing 300 from a feed end 111 of the working station 110 to a produce end 119 of the workstation 110 (shown in FIGS. 3, 5 and 6). The feed end 111 and the produce end 119 of the workstation 110 may be opposite to each other. In certain embodiments, the moving module 112 may include multiple drive rollers to move the layflat tubing 300 by rotation, and guide rollers to maintain or change direction of the layflat tubing 300, such that the layflat tubing 300 may be moved smoothly from the feed end 111 to the produce end 119. The layflat tubing 300 may contact a part of the circumference of some of the rollers, so as to be moved by the friction between the layflat tubing and the rollers. The moving speed or moving distance of the layflat tubing 300 may be determined by the rotations speed and the circumference of at least one of the drive roller. In certain embodiments, the moving module 102 may also be named as a moving mechanism. In certain embodiments, the sealing, punching and cutting position on the layflat tubing 300 is controlled by adjusting the rotation speed of at least one drive roller.

Figure 4A:
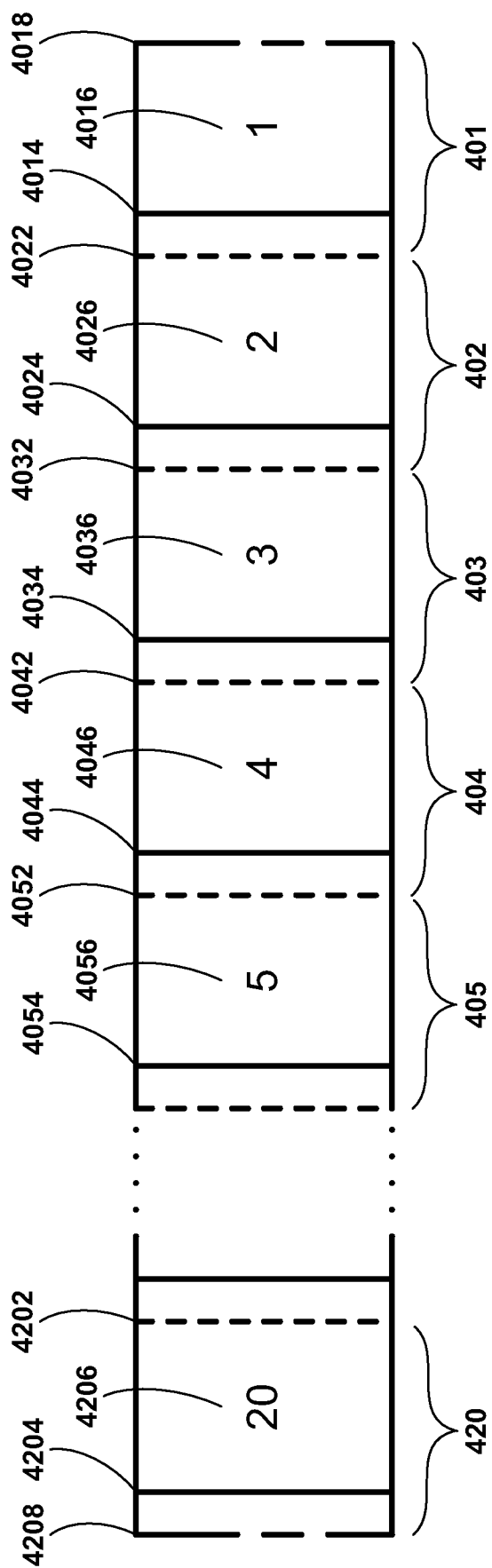
FIG. 4A schematically shows a roll of bags before winding according to one embodiments of the present invention.

The sealing module 114 is configured to seal the layflat tubing 300 so as to form a sealed bottom for each of a plurality of bag units of the formed one roll of bags as shown in FIG. 4A. In certain embodiments, the term "bag unit" refers to each unit of the roll of bags that can be tore apart to form a bag. In certain embodiments, the term "bag unit" also refers to a part of the layflat tubing 300 before being fed to the workstation 110, or during the sealing/punching/cutting, which corresponds to the bag unit of the roll of bags. In certain embodiments, the term "bag unit" and "bag" may also be used interchangeably. In certain embodiments, the sealing module 114 includes a hot knife, which can be heated to a pre-determined temperature. In certain embodiments, the hot knife may seal the layflat tubing 300 by pressing the layflat tubing 300 toward a surface of the workstation. In certain embodiments, the hot knife may be formed of an upper piece located above the layflat tubing 300 and a lower piece located below the layflat tubing 300, and the upper piece and the lower piece are located facing each other. When a predetermined position of the layflat tubing 300 for sealing is located right between the upper piece and the lower piece, the upper piece may move toward the lower piece and touch the layflat tubing 300, so as to form a sealing line on the layflat tubing. In certain embodiments, in the working plane of the workstation 100, the moving direction of the layflat tubing 300 from the feed end 111 to the produce end 119 is defined as length direction, and the direction perpendicular to the length direction is defined as width direction, and the sealing direction is the width direction. The temperature of the hot knife, the pressing force of the hot knife on the layflat tubing, the pressing time, etc., are configured so as to form the sealing line. The sealing module 114 may also be named as a sealing mechanism.

The punching module 116 is configured to form a punching line between the bag units, such that the bag units can be separated from each other easily when a user tears one of the bag units along the punching line to get one separated bag. The punching line may be formed by partially cutting the layflat tubing 300, or by forming multiple holes along the punching line. The punching module 116 may be a structure including multiple pins, and the multiple pins may be aligned to punch holes on the layflat tubing 300. In certain embodiments, the punching module 116 is a knife to partially cut the layflat tubing 300. The parameters of punching position, the punching force, etc., of the punching module 116 may be configured by the controller 150. The punching module 116 may also be named as a punching mechanism.

The cutting module 118 is configured to, when a pre-determined number of bag units for a roll is formed, cut those bag units from the rest of the layflat tubing, such that those pre-determined number of bags can be wound to form a roll of bags 400 (shown in FIG. 3). In certain embodiments, the cutting module 118 is a knife configured to cut along the punching line of the last bag unit of the pre-determined number of bag units. In certain embodiments, the last bag unit may not require to have a punching line since a cutting will be performed by the cutting module 118 at the position of the punching line of that bag unit. In certain embodiment, the punching module 116 and the cutting module 118 may be the same structure, and that structure is configured to punch those punching lines of the bag units, while totally cut the punching line of the last bag unit of the pre-determined number of bag units. The cutting module 118 may also be named as a cutting mechanism.

The winding module 120 is configured to, when the pre-determined number of bag units are cut from the rest of the layflat tubing, wind those bag units into a roll to form a roll of bags 400. The roll of bags 400 may also be named as a roll of bag units. In certain embodiments, the winding process starts before the cutting of those pre-determined number of bag units from the rest of the layflat tubing. The winding module 120 may include a winding bar and a driving mechanism for rotating the winding bar, such that the roll of bags winds around the winding bar. In certain embodiments, the winding bar is a paper core or plastic core fixed to a driving roller of the driving mechanism, where the paper core or plastic core can be removed after the winding process, so as to form the roll of bags with the paper core or plastic core in the center. The winding module 120 may also be named as a winding mechanism.

In certain embodiments, the cutting module 118 and the winding module 120 may be parts of a packing machine that is independent from the workstation 110, and the packing machine can be coupled to the workstation 110 to pack the formed bag units into a roll.

In certain embodiments, the workstation 110 may further include a printing device 122 to print patterns on the layflat tubing 300. In certain embodiments, each of the bag units is printed with an identical pattern by the printing device 122. The printing device 122 may be a printer that is coupled to or is a part of the workstation 110. The printing of the pattern may be performed before the sealing, punching, or may be performed simultaneously with the sealing and punching. In certain embodiments, the printing device may also be an independent printer or a printer coupled with the layflat tubing making machine 170, such that the layflat tubing 300, before being fed to the workstation 110, already contain those repeating patterns.

In certain embodiments, the workstation 110 further includes frames or supports to adjust the length of the bag unit. For example, the workstation 110 may have a V shaped support. The V shaped support has an adjustable height. The layflat tubing 300, when moves along the surface of the workstation 110, may be pushed upward by the V shaped support. Thus, the layflat tubing 300 is not only extendable along the horizontal direction, but also extendable along the vertical direction. In this way, the workstation 110 does not need to occupy a too large much space from the feed end 11 to the produce end 119, to accommodate lengthy bag units. In certain embodiments, the combination of the V shaped support and the sealing/punching/cutting process helps to define the length of the bag unit.

The coding machine 130 is configured to print a counting mark on at least one of the bag units made from the layflat tubing 300. The coding machine 130 is positioned relative to the workstation 110 or fixed to the workstation 110. In certain embodiments, as shown in FIG. 2B, the coding machine 130 includes a main body 132, a fixing structure 134, and a spraying gun 136. The main body 132 includes a replaceable ink cartridge for providing ink, and has a pressure mechanism to spray the ink through the spraying gun 136. The main body 132 may include one ink or multiple inks having different colors. The spraying gun 136 is connected to the main body 132 via a cable, and the ink of the ink cartridge can be moved from the main body 132 to the spraying gun 136 via the cable. In certain embodiments, the cable includes one or more channels, and at least one channel corresponds to one of the different colors of inks. Further, the spraying gun 136 may be fixed to the fixing structure 134, so as to be positioned relative to the workstation 110 or to be positioned corresponding to the position of the layflat tubing 300 that is to be sprayed. At time when needed, the main body 132 provides ink to the spraying gun 136, and provides a pressure to spray the ink out of the nozzle of the spraying gun 136. The spraying gun 136 may have one or more nozzles for spraying ink toward certain positions of the layflat tubing 300, each channel corresponds to one or more nozzles. In certain embodiments, there are three cartridges of inks, red, green and blue. The cable includes three channels each corresponding to one of the three cartridges of inks. The three channels merged to one nozzle, such that the produced ink have a specific color corresponding to the amount of three inks delivered, or the three channels each corresponding to one nozzle, so as to form a counting mark with different colors. In certain embodiments, only one black ink cartridge is required, the black ink pass through the one channel of the cable, and sprayed out through one or more nozzles to form a black counting mark on the targeted bag units.

In certain embodiments, the system 100 may include other labeling methods instead of the coding machine 130. For example, one labeling method may be adding a label sticker to certain bag units. Preferably, the methods are configurable to match with the sealing and punching and/or cutting process, so that the labeling can be performed simultaneously with the sealing and punching/cutting process.

The controller 150 is configured to control the operations of the workstation 110 and the coding machine 130. In certain embodiments, when the system 100 includes the layflat tubing making machine 170, the controller 150 also controls the operation of the layflat tubing making machine 170. In certain embodiments, the controller 150 coordinates operations of the workstation 110, the coding machine 130, and the layflat tubing making machine 170. In certain embodiments, the controller 150 is one integrated structure that is connected to the workstation 110, the coding machine 130 and the layflat tubing making machine 170. In other embodiments, the workstation 110 has its own controller, the coding machine 130 has its own controller, and the layflat tubing making machine 170 has its own controller, and the controller 150 is connected to the controller of the workstation 110, the controller of the coding machine 130, and the controller of the layflat tubing machine 170 to coordinate the operations of the workstation 110, the coding machine 130 and the layflat tubing making machine 170. In certain embodiments, there is no such a separate controller 150, instead, the controller of the workstation 110, the controller of the coding machine 130, and the controller of the layflat tubing machine 170 are communicatively connected to each other to perform the operations of the system 100. As shown in FIG. 2C, the controller 150 may be a computing device including a processor 152, a memory 154, an interface 156 and a non-volatile memory 158.

The processor 152 controls operation of the controller 150. In certain embodiments, the processor 152 may be a central processing unit (CPU). The processor 152 may execute any computer executable code or instructions, such as a firmware 160 or other codes stored in the controller 150. In certain embodiments, the controller 150 may run on or more than one processor, such as two processors, four processors, eight processors, or any suitable number of processors.

The memory 154 may be a volatile memory, such as the random-access memory (RAM), for storing the data and information during the operation of the controller 150. In certain embodiments, the memory 154 may be a volatile memory array. In certain embodiments, the controller 150 may run on more than one memory 154.

The interface 156, such as a touch screen, is configured for the user to enter parameters for operating the workstation 110, the coding machine 130, and the layflat tubing making machine 170.

The non-volatile memory 158 is a non-volatile data storage media or device for storing the computer executable code of the controller 150. Examples of the non-volatile memory 158 may include flash memory, memory cards, USB drives, or other types of non-volatile storage devices such as hard drives, floppy disks, optical drives, or any other types of data storage devices. In certain embodiments, the controller 150 may have more than one non-volatile memory 158, and the firmware 160 and other applications of the controller 150 may be stored in the more than one non-volatile memory 158 separately.

The non-volatile memory 158 stores the firmware 160 of the controller 150. The firmware 160 of the controller 150 includes computer executable codes for performing the operation of the controller 150. In certain embodiments, the computer executable code or instructions may collectively form the firmware 160. In certain embodiments, the firmware 160 is configured to, when being executed by the processor 152 in the memory 154, control the operations of the workstation 110, the coding machine 130, and optionally the layflat tubing making machine 170. The operations of the layflat tubing making machine 170 may include feeding plastic material 200 (shown in FIG. 3), mixing the plastic material, heating the mixed plastic material and blowing the heated plastic material to extrude plastic tube or film, cooling and deflating the plastic tube to form the layflat tubing 300. The operations of the workstation 110 may include moving the layflat tubing from the feed end to the produce end, sealing the layflat tubing at pre-determined spacing, punching the layflat tubing at the pre-determined spacing, cutting the layflat tubing after a pre-determined number of bags, and winding the cut bags into a roll.

FIG. 3 shows manufacturing of a roll of bags according to one embodiments of the present invention. As shown in FIG. 3, plastic material 200 is provided to the layflat tubing making machine 170. The plastic material 200 includes high density or low density polyethylene, degradable polyethylene, polyactic acid, etc. The layflat tubing making machine 170, under the control of the controller 150, produces the layflat tubing 300. The layflat tubing 300 is fed to the feed end 111 of the workstation 110. The workstation 110 and the coding machine 130, under the control of the controller 150, produce the roll of bags 400. In certain embodiments, the operation of the layflat tubing making machine 170, the workstation 110 and the coding machine 130 are operated under the control of the controller 150, so as to produce the roll of bags 400 automatically without interruption. In certain embodiments, the system 100 may only include the workstation 110, the codding machine 130 and the controller 150, and the layflat tubing 300 is purchased directly from a provider.

Figure 4B:
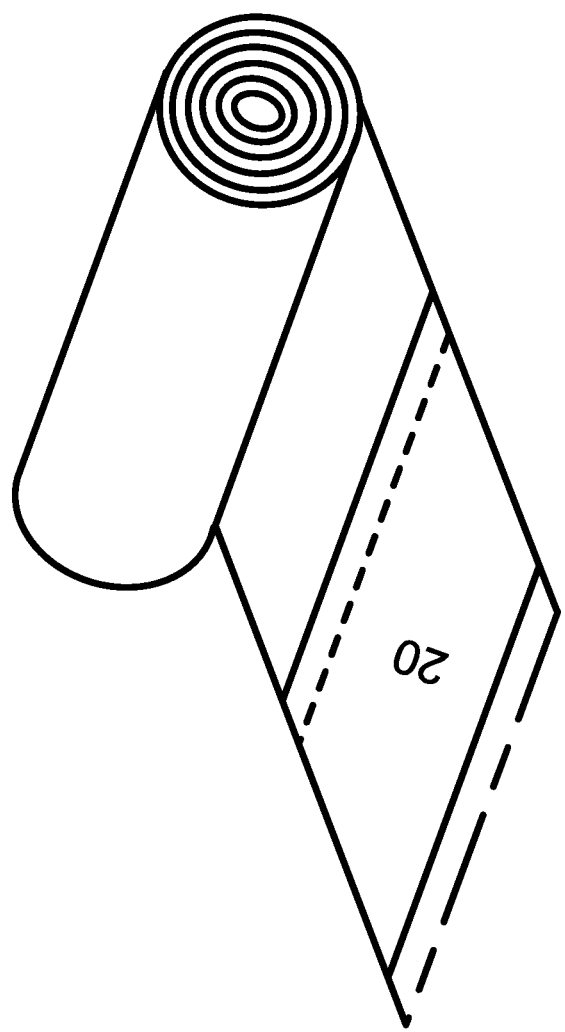
FIG. 4B schematically shows a roll of bags partially wound according to one embodiment of the present invention.

FIG. 4A schematically shows a roll of bags before winding according to one embodiments of the present invention, and FIG. 4B schematically shows a roll of bags partially wound according to one embodiment of the present invention. Referring to FIG. 4A, the roll of bags 400 includes 20 bag units. Each of the 20 bag units, when tearing off from the roll, is a bag with an opening and a sealed bottom. In certain embodiments, the number of bag units in the roll of bags 400 is in a range from 5-500. In certain embodiments, the number of bag units in the roll is in a range of from 10-200. In certain embodiments, the number of bag units in the roll is in a range of from 15-50. In one embodiment, the roll of bags 400 has 15 or 20 bag units.

In the example shown in FIG. 4A, the roll of bags 400 includes 20 bag units. The 20 bag units are named 401, 402, 403, . . . , 420, and the first bag unit 401 will be wound into the roll first. After winding, the first bag unit 401 is located at the center of the roll, while the bag unit 20 is located at the outmost part of the roll. As shown in FIG. 4A, the first bag unit 401 has a cutting line 4018, a sealing line 4014, and a counting mark 4016 sprayed on the main body of the first bag unit 401. The cutting line 4018 may be formed by cutting the layflat tubing 300 by the cutting module 118. In certain embodiments, the cutting line 4018 already exists at the layflat tubing 300 before feeding the layflat tubing 300 to the workstation 110, therefore, no action is required at the workstation 110 to form the cutting line 4018. The sealing line 4014 is formed by the sealing operation of the sealing module 114, so as to form the bottom of the first bag unit 401. The counting mark 4016 may be a number, a word, or a warning message. The counting mark 4016 may be printed using a specific color. For example, the counting mark 4016 may be a red colored number "1", "I", a yellow colored warning message "One bag left" or "One bag remaining," or a red message "Please purchase the next roll of bags," or a combination thereof.

The second bag unit 402 has a punching line 4022, a sealing line 4024, and a counting mark 4026 sprayed on the main body of the second bag unit 402. The punching line 4022 may be formed by punching the layflat tubing 300 by the punching module 116. The punching line 4022 is formed after the first sealing line 4014 by a short distance. The sealing line 4024 is formed by the sealing operation of the sealing module 114, so as to form the bottom of the second bag unit 402. The counting mark 4026 may be a number, a word, or a warning message. The counting mark 4026 may be printed using a specific color. For example, the counting mark 4026 may be a red colored number "2", "II", a yellow colored warning message "Two bags left," or a red message "Please purchase the next roll of bags," or a combination thereof.

Similarly, the third bag unit 403, the forth bag unit 404, and the fifth bag unit 405 follow the first bag unit 401 and the second bag unit 402. The third bag unit 403 has a punching line 4032, a sealing line 4034, and a counting mark 4036 sprayed on the main body of the third bag unit 403. The fourth bag unit 404 has a punching line 4042, a sealing line 4044, and a counting mark 4046 sprayed on the main body of the fourth bag unit 404. The fifth bag unit 405 has a punching line 4052, a sealing line 4054, and a counting mark 4056 sprayed on the main body of the fifth bag unit 405.

The $20^{th}$ bag unit 420 has a punching line 4202, a sealing line 4204, and a counting mark 4206 sprayed on the main body of the $20^{th}$ bag unit 420. The punching line 4202 may be formed by punching the layflat tubing 300 by the punching module 116. The sealing line 4204 is formed by the sealing operation of the sealing module 114, so as to form the bottom of the $20^{th}$ bag unit 420. The counting mark 4026 may be a number, a word, or a warning message. The counting mark 4206 may be printed using a specific color. For example, the counting mark 4026 may be a red colored number "20", "XX", a yellow colored warning message "19 bags left," or a combination thereof. The $20^{th}$ bag unit 420 may further include a cutting line 4208 formed after the sealing line 4204. The cutting line 4208 is formed by the cutting operation of the cutting module 118, so as to separate the $20^{th}$ bag unit 420 from the rest of the layflat tubing 300. After the cutting, the roll of bags 400 can be wound to include from the first bag unit 401 to the $20^{th}$ bag unit 420.

In certain embodiments, the counting marks from the first bag unit 401 to the last bag unit 420 may be labeled sequentially from 1 to 20. Alternatively, the counting marks from the first bag unit 401 to the last bag unit 420 may be labeled reversely from 20 to 1. In certain embodiments, each of the 20 bag units is labeled with a counting mark. In other embodiments, only several bag units from the beginning, or the most inner side of the roll, are labeled with the counting mark. For example, the first 1-10 bag units may be labeled with the counting marks. In one embodiment, only the first 3-5 bag units are labeled with the counting marks. In one embodiment, the first three bag units 401, 402 and 403 are labeled with the counting marks.

As described above, the counting marks sprayed on the bag units may be different from each other. This is different from the function of the printing device 122, where identical patterns are printed on each of the bag units.

FIG. 4B schematically shows a roll of bags partially wound according to one embodiment of the present invention. In this figure, most of the bag units are wound into a roll, with the first bag unit inside or in the center. The last bag unit 20 can be still seen since the winding process has not completely done yet.

FIG. 5 schematically shows an exploded view of a system for manufacturing a roll of bags according to one embodiment of the present invention. As shown in FIG. 5, the workstation 110 includes a gear 113, which may be a part of the moving module 112. The gear 113 may be linked with certain drive rollers to move the layflat tubing 300 from the feeding end 111 toward the produce end 119. The workstation 110 may further include a sensor 115, for example an infrared color sensor, for detecting the position of the layflat tubing 300. In certain embodiments, each bag unit of the layflat tubing 300 may be printed with an image or pattern by the printing device 122. When the color sensor 115 emits an infrared light toward the layflat tubing 300 and senses the light reflected by the layflat tubing 300, the sensor 115 is able to detect the change of the emitted light and the received light, so as to locate the position of the bag unit.

As shown in FIG. 5, the coding machine 130 includes the main body 132, which may have its own controller and a screen to show the operation of the coding machine 130. In certain embodiments, the screen is a touch screen configured for the user to enter parameters. In other embodiments, the parameters may be entered through another interface connected to the main body 132. The ink bottle (cartridge) 133 contains ink, and can be installed in the main body 132. The fixing structure 134 may be a support or frame structure, and the spraying gun 136 can be fixed to the fixing structure 134. The fixing structure 134 can be moved to a desired position so that the spraying gun 136 can be properly positioned relative to the workstation 110. In the embodiment, the coding machine 130 and the workstation 110 are separated from one another. The layflat tubing 300 may be fed from the feed end of the workstation 110, and a bag unit may be sprayed with a counting mark, such as number "12", by the spraying gun 136.

FIG. 6 schematically shows an assembly view of a system for manufacturing a roll of bags according to one embodiment of the present invention. As shown in FIG. 6, the workstation 110 has the feed end 111 and the produce end 119. The layflat tubing 300 is fed from the feed end 111. The layflat tubing 300 can be defined with a plurality of bag units. In certain embodiments, the layflat tubing 300 is printed with patterns to each of the bag unit by the printing device 122. Each of the bag units may be printed with the same pattern.

During the process of moving from the feed end 111 toward the produce end 119, the bag units may be sealed and punched. As shown in FIG. 4A, the bag unit 402 is sealed with a sealing line or a welding line 4024, and is separated with the first bag unit 401 and the third bag unit 403 by the punching lines 4022 and 4032. In certain embodiment, some bag units are each sprayed with a counting mark by the spraying gun 136. In certain embodiments, the operation of the spraying gun 136 is coupled with the operations of the sealing mechanism 114, the punching mechanism 116 or the cutting mechanism 118.

Figure 7:
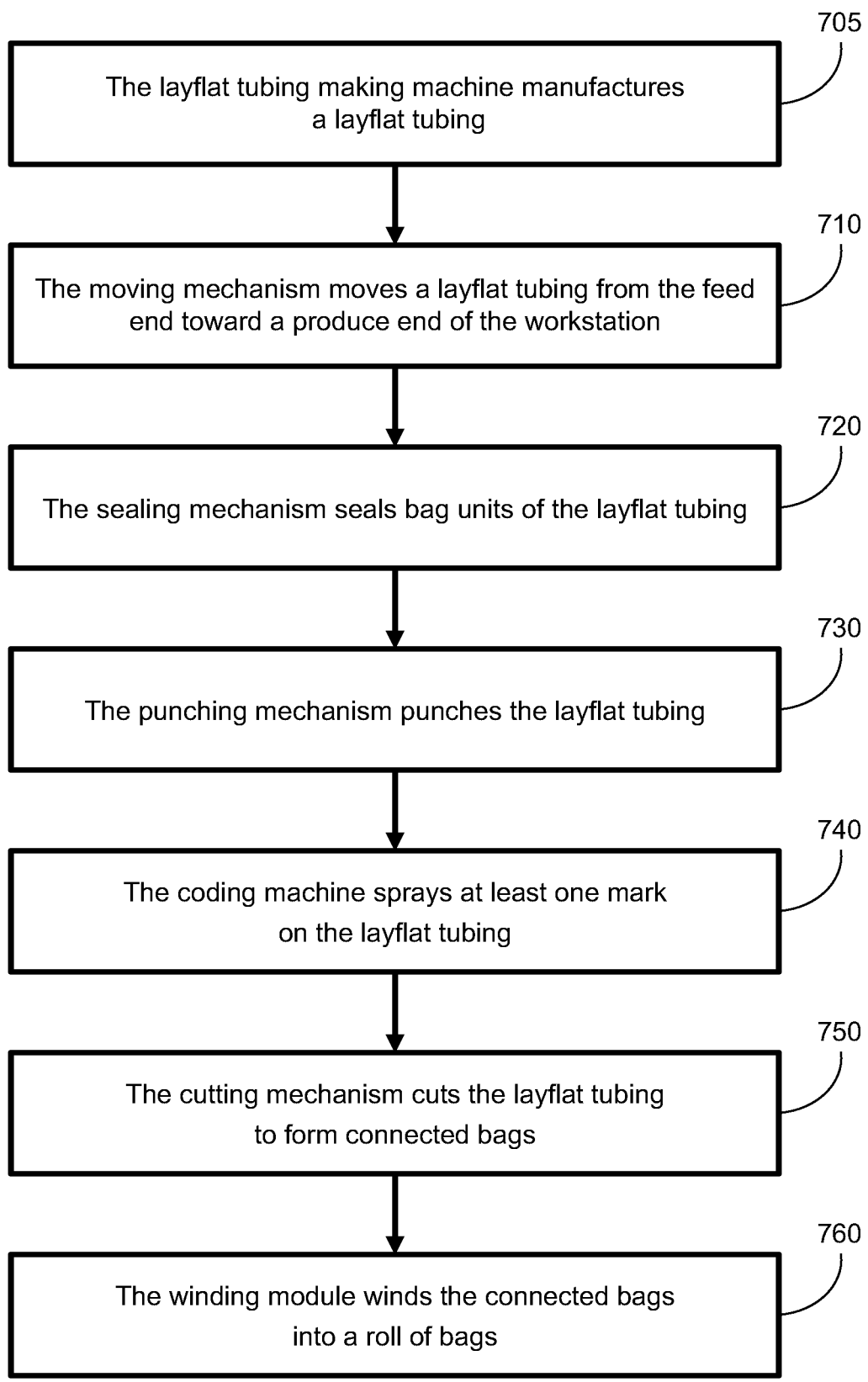
FIG. 7 schematically depicts a flowchart of a method for manufacturing a roll of bags with counting marks according to certain embodiments of the present disclosure.

FIG. 7 schematically depicts a flowchart of a method for manufacturing a roll of bags with counting marks according to certain embodiments of the present disclosure. In certain embodiments, the method as shown in FIG. 7 may be implemented on a system as shown in FIG. 1. It should be particularly noted that, unless otherwise stated in the present disclosure, the steps of the method may be arranged in a different sequential order, and are thus not limited to the sequential order as shown in FIG. 7.

As shown in FIG. 7, at procedure 705, the layflat tubing making machine 170 manufactures a layflat tubing 300. The layflat tubing making machine 170 may use plastic material 200 as input, mixing the plastic material 200, heating the mixed plastic material and blowing the heated plastic material to extrude plastic tube or film, cooling and deflating the plastic tube to form the layflat tubing 300. In certain embodiments, the procedure 705 may not be necessary, and the layflat tubing 300 may be purchased and used as input of the next procedure 710.

As shown in FIG. 7, at procedure 710, the moving module 112 of the workstation 110 feeds the layflat tubing 300 from the feed end 111, and moves the layflat tubing 300 toward the produce end 119. The layflat tubing 300 has a length direction and a width direction perpendicular to the length direction. The length direction of the layflat tubing 300 is aligned with the direction from the feed end 111 to the produce end 119. In other words, the length direction is aligned with the moving direction. In certain embodiments, one or more drive rollers are used to move the layflat tubing 300. In certain embodiments, the rotation speed and rotation time of the drive rollers can be configured via an interface of the controller 150, such that the moving length of the layflat tubing 300 can be defined accurately. In certain embodiments, a sensor 115 is provided to determine the position of the bag unit of the layflat tubing 300.

At procedure 720, the sealing module or the sealing mechanism 114 seals each bag unit of the layflat tubing 300. The sealing of the layflat tubing 300 is along the width direction, and forms multiple sealing lines. Each of the sealing lines corresponds to one of the bag units. The parameters of the sealing process, such as the sealing temperature of the hot knife, the press force for moving the sealing knife, and position of the sealing can be configured and adjusted using the interface of the controller 150. In certain embodiments, the position of the sealing line is adjusted by the moving distance of the drive roller. For example, the drive roller may move the layflat tubing 300 with a distance corresponding to one bag unit, and then stops so that the sealing module 114 can seal one of the corresponding bag unit. After the sealing is completed, the drive roller moves the layflat tubing 300 for another bag unit, and the sealing module 114 then seals the next bag unit. In certain embodiments, the location of the bag unit is further determined or confirmed by the color sensor 115.

At procedure 730, the punching module or the punching mechanism 116 punches a punching line or dotted line between two neighboring bag units of the layflat tubing 300, so that a user can tear one bag from the roll of bags easily along the punching line. The punching of the layflat tubing 300 is along the width direction, and forms multiple punching lines. Each of the punching lines is located between two neighboring bag units. The parameters of the punching process, such as the punching force for moving the punching pins, and position of the punching, size and density of the punching hole, can be configured and adjusted using the interface of the controller 150. In certain embodiments, the position of the punching line is adjusted by the moving distance of the drive roller. For example, the drive roller may move the layflat tubing 300 with a distance corresponding to one bag unit, and then stops so that the punching module 116 can punch between two neighboring bag units. After punching is completed, the drive roller moves the layflat tubing 300 for another bag unit, and the punching module 116 then punches the next punching line between two neighboring bag units. In certain embodiments, the location of the bag units is further determined or confirmed by the color sensor 115.

In certain embodiments, the operation of the sealing 720 and punching 730 may be performed simultaneously, or one after another. For example, the drive roller may move the layflat tubing 300 for one bag units and then stops, the sealing module 114 and the punching module 116 make one sealing line and one punching line, and then the drive roller starts again and moves the layflat tubing 300 for another bag unit.

At procedure 740, the coding machine 130 sprays a counting mark on at least one bag unit of the layflat tubing 300. In certain embodiments, the counting mark is sprayed at a desired position on the layflat tubing, and the counting mark is located between two adjacent punching lines. In certain embodiments, for a roll of bags formed from the layflat tubing 300, the roll of bags may include a first number of bag units. The first number may be in a range from 5-500. In certain embodiments, the first number is 10-200. In certain embodiments the first number is 15-50. In one embodiment, the first number is 15 or 20. Using the first number of 20 as an example, in certain embodiments, all the 20 bag units are sprayed with counting marks. The counting marks may be sequential numbers. In certain embodiments, the counting mark indicates relative position of the corresponding bag in the roll of bags. For example, the first bag units is sprayed with number 1, the second bag units is sprayed with number 2, . . . , and the last bag unit is sprayed with number 20. Here the first bag unit refers to the bag unit that located nearest to the produce side 119 than the other bag units. When the 20 bags are wound to form the roll of bags, the first bag unit is located at the most inner side or the center of the roll. In certain embodiments, only the first 3-5 bag units are labeled with counting marks. In certain embodiments, each of the counting marks is located at the center portion of the corresponding bag units, but not limited thereof. The parameters of the spraying process, such as the location and angle of the spraying gun 136 relative to the workstation 110, may be adjusted manually by an operator or automatically by the controller 150. The parameters of the color, font, word direction, space between characters, and content of the counting mark may be defined by the controller 150. In certain embodiments, the coding machine 130 is coupled with the drive roller of the workstation 110 to ensure spraying of the counting mark at the right time and the correct position. In certain embodiments, the coding machine 130 is coupled with the sensor 115 to ensure spraying the counting mark accurately on the targeted bag units, since the location of the bag unit may be determined accurately by the sensor 115. The sensor 115 may detect the pattern on the bag unit printed by the printing device 122, or detect the counting mark on the bag unit sprayed by the coding machine 130. The counting mark on each of the roll of bags is different from each other.

At procedure 750, the cutting module 118 cuts the first number of bag units from the layflat tubing 300. The cutting operation may be performed along the width direction of the layflat tubing 300, at the punching line (or cutting line under this situation) of the last bag unit of the first number of bag units. Therefore, the first number of bag unites, for example 20 bag units, are cut and separated from the layflat tubing 300, where each of the bag unit has a sealing line, two neighboring bag units are separated by a punching line.

At procedure 760, the winding module 120 winds the first number of bag units into a roll. The first bag unit of the first number of bag units is wound first, then the second bag unit, . . . and so on, so that the first bag unit is located at the center of the roll of bag units.

According to certain embodiments of the present invention, the spraying of counting marks by the spraying gun 136 is coupled with the process of sealing, punching and/or cutting, which makes the manufacturing of rolls of bags with counting marks conveniently. The structure and function of the coding machine 130 is different from that of the printing device 122, where the coding machine 130 is used to spray counting marks that are different from each other on the last few bag units in the roll of bags, while the printing device 122 device is configured to print the same pattern on each of the bag units of the layflat tubing 300. In certain embodiments, the layflat tubing 300 is printed with a printing device before being fed to the workstation 110. As described in the above-mentioned embodiments, by providing a coding machine 130 that is different from a printing device, the last few bags of the roll of bags can be labeled with counting marks that are different from each other, which can be used to remind a user that the roll of bags are running out very soon, and a new roll of bags need to be purchased. The user can easily know how many bags are left or remaining based on the counting marks.

In certain embodiments, before the procedure 710, the method may further include a procedure of making the layflat tubing 300 from plastic materials 200 by the layflat tubing making machine 170.

In certain embodiments, the process of using the plastic material to the roll of bags as described above are automatically performed without the need of operator's interruption.

In another aspect, the present invention relates to an integrated system for producing roll of bags with counting marks. The system, in addition to the workstation 110, the coding machine 130 and the controller 150, further includes the layflat tubing producing machine 170. The layflat tubing producing machine 170, the workstation 110 and the coding machine 130 are coupled together and controlled by one or more controllers 150, so as to manufacturing the rolls of bags with counting marks automatically from a plastic material fed to the layflat tubing producing machine 170.

In yet another aspect, the present invention relates to a non-transitory computer-readable medium storing instructions or computer executable code. In certain embodiments, the instruction or the computer executable code may be the firmware 160 stored in the non-volatile memory 158 as described above. The computer executable code, when being executed, may perform one of the methods described above to produce a roll of bags. In certain embodiments, the non-transitory computer readable medium may include, but not limited to, the non-volatile memory 158 of the controller 150 as described above, or any other storage media of the controller 110.

In summary, according to certain embodiments of the present invention, a coding machine 130 is coupled to the workstation to produce a roll of bags, such that different marks can be sprayed on different bag units of the roll of bags. Further, by combining the layflat tubing making machine 170 with the workstation 110, the coding machine 130 and the controller 150, certain embodiments of the present invention provides an automatic process for making roll of bags with counting marks from plastic material.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

Some references, which may include patents, patent applications, and various publications, may be cited and discussed in the description of this invention. The citation and/or discussion of such references, if any, is provided merely to clarify the description of the present invention and is not an admission that any such reference is "prior art" to the invention described herein. All references listed, cited and/or discussed in this specification are incorporated herein by reference in their entireties and to the same extent as if each reference was individually incorporated by reference.

What is claimed is:

1. A system for manufacturing a roll of bags with counting marks, the system comprising:
    a workstation having a feed end and a produce end, the workstation comprising:
        a moving mechanism configured to move a layflat tubing from the feed end toward the produce end, wherein the layflat tubing comprises a length direction and a width direction;
        a sealing mechanism configured to seal the layflat tubing to form a plurality of sealing lines, each of the sealing lines extending along the width direction;
        a punching mechanism configured to punch the layflat tubing to form a plurality of punching lines, each of the punching lines extending along the width direction;
        a cutting mechanism configured to cut the layflat tubing along the width direction to form a plurality of connected bags; and
        a winding mechanism configured to wind the connected bags into the roll of bags; and
    a coding machine coupled to the workstation, and configured to spray at least one counting mark on the layflat tubing, wherein the coding machine comprises a main body, a fixing structure and a spraying gun, wherein the main body comprises one or more replaceable ink cartridges for providing ink and a pressure mechanism to spray the ink through the spraying gun, wherein the spraying gun is fixed to the fixing structure and connected to the main body via a cable such that the ink of the one or more replaceable ink cartridges is operably moved from the one or more replaceable ink cartridges of the main body to the spraying gun via the cable, wherein the cable comprises one or more channels, wherein each channel is adapted for delivering a respective color of the ink, wherein the spraying gun comprises one or more nozzles coupled to the one or more channels of the cable for spraying the ink on the layflat tubing so as to form the at least one counting mark thereon, and
    wherein the connected bags in the roll of bags are separated by the punching lines, each of the connected bags comprises one of the sealing lines, and at least one bag of the roll of bags has one of the at least one counting mark that counts a relative position of the at least one bag in the roll of bags.

2. The system of claim 1, wherein the at least one counting mark comprises a plurality of counting marks that are different from each other, and each of the counting marks is printed on one of the connected bags located at an inner side of the roll of bags.

3. The system of claim 1, wherein the at least one counting mark comprises a number, a warning message, a color paint, or a combination thereof.

4. The system of claim 1, further comprising a controller configured to coordinate operations of the workstation and the coding machine.

5. The system of claim 4, further comprising a layflat tubing making machine configured to make the layflat tubing, wherein the workstation, the coding machine and the layflat tubing making machine are controlled by the controller to automatically make the roll of bags from plastic material fed to the layflat tubing making machine.

6. The system of claim 1, wherein the coding machine is positioned relative to the workstation.

7. The system of claim 1, wherein the main body of the coding machine comprises a screen for displaying operations of the coding machine.

8. The system of claim 7, wherein the screen is a touch screen configured for a user to enter parameters for the operations of the coding machine.

9. The system of claim 1, wherein the one or more replaceable ink cartridges comprise a red cartridge, a green cartridge and a blue cartridge.

10. The system of claim 9, wherein the one or more channels comprise three channels, and each channel is corresponding to one of the red, green and blue cartridges.

11. The system of claim 10, wherein the three channels are merged to one nozzle of the spraying gun such that the ink has a specific color corresponding to amounts of three inks delivered from the red, green and blue cartridges.

12. The system of claim 10, wherein each of the three channels corresponds to one of the one or more nozzles of the spraying gun so as to form a counting mark with different colors.

13. The system of claim 1, wherein the one or more replaceable ink cartridges comprise a black ink cartridge containing black ink that operably passes through one of the one or more channels of the cable and is sprayed out through the one or more nozzles to form a black counting mark on one of the bags.

14. The system of claim 1, wherein the workstation further comprises an infrared color sensor for detecting a position of one of the bags, wherein the infrared color sensor is configured to emit an infrared light toward the layflat tubing, sense light reflected by the layflat tubing, and detect changes of the emitted light and the sensed light so as to locate the position of the one of the bags.

15. The system of claim 14, wherein the infrared color sensor is coupled with the coding machine to detect the at least one counting mark on the one of the bags sprayed by the coding machine so as to ensure accurate spraying of the at least one counting mark on the one of the bags.

* * * * *